United States Patent
Miyairi

Patent Number: 5,690,974
Date of Patent: Nov. 25, 1997

[54] METAL MOLD FOR MOLDING RUNNERLESS PRODUCT

[75] Inventor: Kazuki Miyairi, Hanishina-gun, Japan

[73] Assignee: Nissei Plastic Industrial Co., Ltd., Nagano-ken, Japan

[21] Appl. No.: 631,614

[22] Filed: Apr. 10, 1996

[30] Foreign Application Priority Data

Apr. 17, 1995 [JP] Japan ................... 7-114036

[51] Int. Cl.$^6$ ........................................ B29C 45/38
[52] U.S. Cl. ............... 425/577; 264/106; 264/107; 425/810
[58] Field of Search ....................... 425/577, 810; 264/106, 107

[56] References Cited

U.S. PATENT DOCUMENTS 5,326,240  7/1994  Kudo et al. ........................ 425/810

FOREIGN PATENT DOCUMENTS

| 478515 | 3/1992 | Japan. |
| 524079 | 2/1993 | Japan. |
| 639879 | 2/1994 | Japan. |
| 6297511 | 10/1994 | Japan. |

*Primary Examiner*—Tim Heitbrink
*Attorney, Agent, or Firm*—Weingarten, Schurgin, Gagnebin & Hayes LLP

[57] ABSTRACT

A novel and improved metal mold for molding a runnerless product can be provided. The metal mold according to the present invention comprises a stationary and a movable mold halves, one of which is provided at the center thereof with a recess and the other of which is provided with a compression core to be retractably received by said recess, said stationary and movable mold halves defining a cavity for the runnerless product, and further comprises a hot nozzle inserted into the recess or the compression core and having a tip projecting therefrom to allow resin to be left around the nozzle. In such a construction, a runner section and a gate are defined by said recess and the compression core so as that they are closable by the movement of said compression core, and thereby the center of the final product, e.g. a disc can certainly be finished without punching, cutting or the like.

6 Claims, 3 Drawing Sheets

METAL MOLD FOR MOLDING RUNNERLESS PRODUCT

BACKGROUND OF THE INVENTION

1. Field of the Invention

This invention relates to a metal mold for injection molding a runnerless product which does not comprise any runner portion when released, more particularly relates to a metal mold for injection molding a product having a gate in the inside such as a data recording disc or for the simultaneous injection molding of a plurality of products having a gate at a lateral side.

2. Background Art

In general, an injection molded product is constituted of a final product portion and a runner portion which must be removed when finished. Especially, it is difficult to remove such a runner portion of a doughnut-shaped product such as a data recording disc or the like.

In order to solve the above described problem, metal molds for molding discs are known. For instance, Japanese Patent Application Laid-Open No. 6-39879 describes a metal mold comprising a tubular punch that is arranged at the center of the mold cavity to forcibly separate the runner and the molded product such as a disc or a core having a peripheral edge to be used as a cutter.

A metal mold designed to separate the runner in the inside inevitably has a complicated structure because it has to be equipped with a runner ejector. The molded product is subject to external force that can deform its inner periphery when it is cut and separated from the runner and a rugged cutting surface can be given rise to on the product as the cutter is worn with time.

In a metal mold designed to separate the runner while the resin is still in a molten state, the runner communicating with the cavity between the stationary mold half and the movable mold half is made very deep in an attempt to prevent the molten resin in the runner from being quickly cooled and solidified after the completion of an injecting and filling operation by the metal mold that is constantly being cooled and a gate is formed at the front end of the runner by narrowing the peripheral wall thereof. Consequently, the resin being discharged from the runner into the cavity faces a large resistance because of the existence of the narrow gate to deteriorate the molding condition. Particularly, the molding accuracy of the inner peripheral edge of the metal mold is adversely affected by the arrangement of a narrow gate to produce a poorly finished product.

If means of heating the runner is provided to keep the resin in the runner constantly in a molten state, the runner does not have to be made very deep and the gate does not have to be made particularly narrow so that the problem of the resistance against flowing resin may disappear. However, it is difficult to reconcile the heated runner and the cooled metal mold and the accuracy and the operability of such a molding arrangement may inevitably be low. Additionally, the provision of heating means makes the entire molding system rather complicated and the space required to accommodate the heating means can reduce the strength of the metal mold.

In view of the above identified problems of existing metal molds for molding runnerless products, it is therefore the object of the present invention to provide a novel metal mold having a simple configuration of comprising a runner selection arranged between the stationary mold half and the movable mold half and a recess for providing an insulating resin layer arranged on a side thereof. A metal mold according to the invention can produce high quality products by injection molding.

SUMMARY OF THE INVENTION

According to a first aspect of the invention, the above object is achieved by providing a metal mold for molding a runnerless product, said mold comprising: a stationary mold half provided at the center thereof with a recess having a port at the center thereof, a movable mold half provided with a compression core to be retractably received by said recess, said stationary and movable mold halves defining a cavity for the runnerless product, a hot nozzle inserted into the port of said recess of the stationary mold half and having a tip projecting therefrom to allow resin to be left around the nozzle, where a runner section and a gate are defined by said recess and the compression core so as that they are closable by the movement of said compression core.

According a second aspect of the invention, providing a metal mold for molding a runnerless product, said mold comprising; a movable mold half provided at the center thereof with a recess, a stationary mold half provided with a compression core to be retractably received by said recess, said compression core having a bore thereinside, said stationary and movable mold halves defining a cavity for the runnerless product, a hot nozzle inserted into the bore of said compression core of the stationary mold half and having a tip projecting therefrom to allow resin to be left around the nozzle, where a runner section and a gate are defined by said recess and the compression core so as that they are closable by the movement of said compression core.

In a metal mold according to either aspect of the invention, said cavity is, e.g. disc-shaped and said recess and compression core have a circuit plan view and a juxtaposed at the center of the recess, a circular runner section having an annular gate being defined by the peripheral edges of the compression core and the recess.

With a metal mold having a configuration as described above, a gate, or a gap, is defined by the outer periphery of the compression core caused to project by a certain distance and the peripheral wall of the recess and, as molten resin is injected through the hot nozzle, it firstly fills the runner section temporarily formed between the recess and the compression core and then flows into the cavity through the gate.

Immediately after the operation of injecting molten resin is completed, the compression core is moved forward to a position close to the nozzle tip. Then, the molten resin in the runner section is compressed and partly forced into the hot nozzle and the cavity and the gate is closed. The molten resin in the recess is compressed and, as the metal mold is cooled, solidified to form a resin layer, which will remain in the recess.

As the core is retracted to a predetermined position, the recess around the nozzle is filled with the resin layer and a proper runner section is defined by the resin layer and the compression core. From then on, the operation of injecting resin and filling the cavity with resin is carried out by way of the runner section having a side defined by the resin layer so that, once the injecting is completed, the latter is forced into the hot nozzle and the cavity as the compression core is made to advance. The net result is a runnerless molded product.

Since the resin layer left in said recess is a poor thermal conductor, it can effectively prevent the nozzle from being cooled by the cold metal mold to produce flawless products that are free from so-called flow marks, cold marks and so on.

DETAILED DESCRIPTION OF THE PREFERRED EMBODIMENTS

Figure 1:
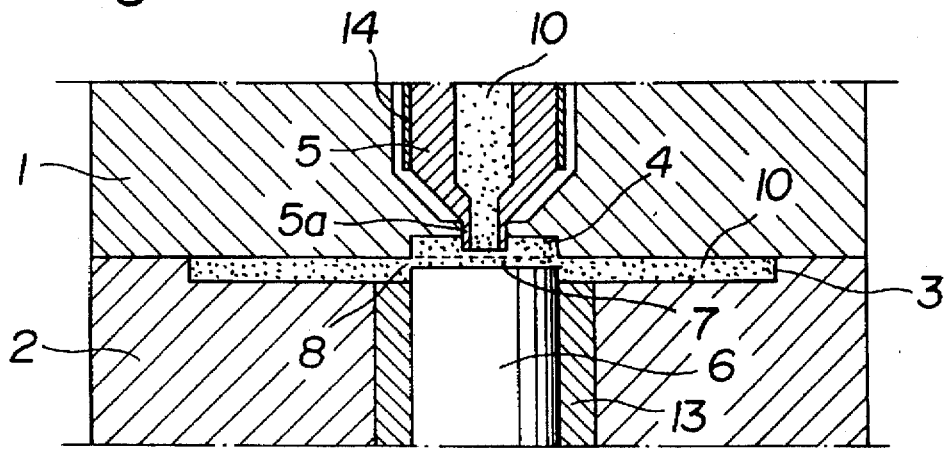
FIG. 1 is a schematic cross sectional view of a principal portion of an embodiment of the metal mold according to the invention, illustrating how molten resin is injected from a temporarily provided runner section into a cavity.
Figure 2:
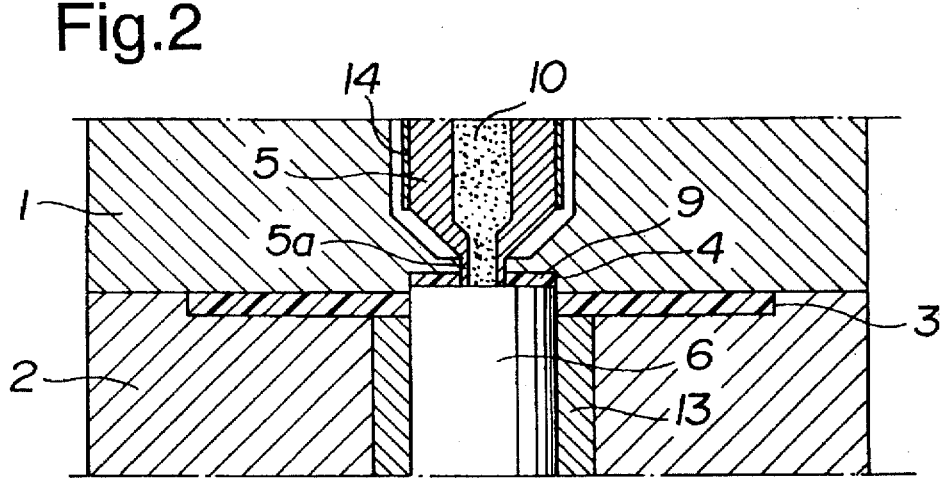
FIG. 2 is a schematic cross sectional view of the embodiment of FIG. 1, illustrating how a resin layer is formed in a recess.
Figure 3:
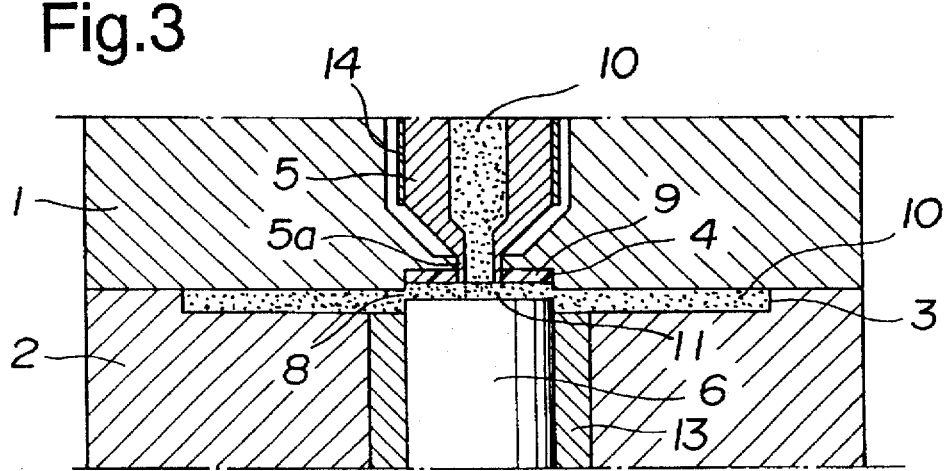
FIG. 3 is a schematic cross sectional view similar to FIG. 1, illustrating how molten resin is injected from a regular runner section into a cavity.
Figure 4:
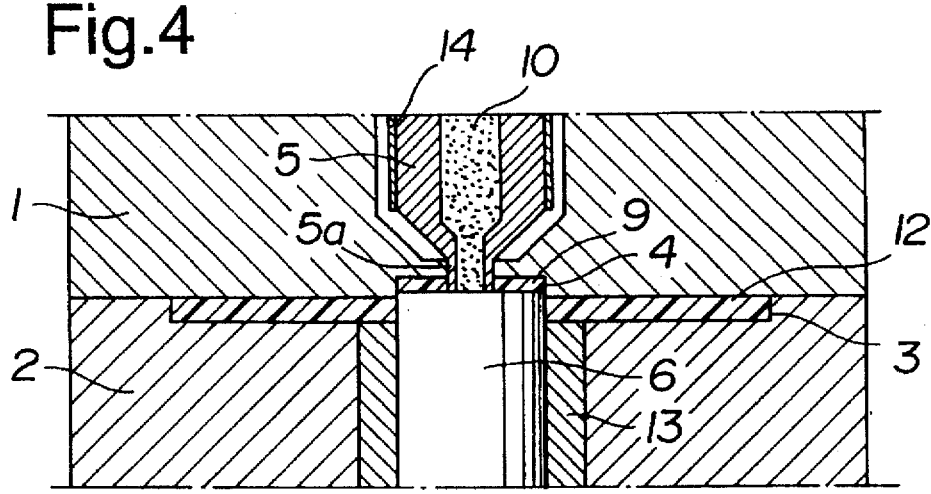
FIG. 4 is a schematic cross sectional view similar to FIG. 1, illustrating how the runner section is closed.

Throughout the drawings, reference numerals 1 and 2 respectively denote a stationary mold half and a movable mold half of a metal mold according to the invention. As the two mold halves are put together, a circular or short cylindrical cavity 3 is produced within the mold. Referring firstly to FIGS. 1 through 3 illustrating a first embodiment of the invention, the stationary mold half 1 is provided at the center thereof with a circular recess 4 having a predetermined depth and a port at the center thereof and the tip 5a of a hot nozzle 5 is projecting from the port of the recess 4, said hot nozzle 5 being housed in the stationary mold half 1 with an insulating gap arranged therebetween.

A cylindrical compression core 6 is movably arranged at the center of the movable mold half 2 in such a way that it is snugly received in the recess 4 with a slight clearance disposed between the compression core 6 and the lateral wall of the recess 4 when it is moved forward. The front end of the compression core 6 is designed to form a temporary runner section 7 with the bottom of the recess 4 while an annular gate 8 is defined by the peripheral edge of lateral wall of the recess 4 and the corresponding frontal peripheral edge of the compression core 6.

Appropriate values can be selected for the depth of the temporary runner section 7 and the gap of the gate 8 by controlling the position of the front end of the compression core 6. Thus, as molten resin 10 is injected into the runner section 7 through the hot nozzle 5, it fills the runner section 7 and then flows into the cavity 3 through the gate 8.

Immediately after the operation of injecting molten resin is completed, when the resin in the runner section 7 is still in a completely molten state, part of the resin in the temporary runner section 7 is forced to flow into the hot nozzle 5 and the cavity 3 as the compression core 6 is moved forward to a position close to the nozzle tip 5a. This forced flow of resin terminates when the peripheral edge of the front end of the compression core 6 comes into engagement with the peripheral wall of the recess 4 to completely close the gate 8 and, once the gate is closed, the resin in the temporary runner section 7 is forced back into the hot nozzle 5. Additionally, since the walls defining the recess 4 are constantly cooled, the compressed resin is cooled to become solid and remains there to form a resin layer 9.

Thereafter, as the compression core 6 is retracted to a predetermined position, the recess surrounding the nozzle is filled with the resin layer 9 to produce a proper runner section 11. From then on, molten resin is injected into the cavity 3 to fill the latter by way of this proper runner section 11 and, after the injecting and filling operation is over, any molten resin remaining in the runner section 11 is forced into the hot nozzle 5 and the cavity 3 by the advancing compressing core 6.

As the molten resin is cooled and solidified in the cavity 3, a disc-shaped product 12 is molded. The product 12 becomes runnerless as the gate 8 is closed and is provided with a central opening to show a doughnut-like appearance.

The resin layer 9 remains in the recess if the above described molding cycle is repeated. Additionally, since synthetic resin is a poor conductor of heat, the resin layer 9 operates as an thermal insulation layer to prevent the nozzle tip 5a from being cooled by the metal mold that is now cold. Thus, the products produced out of the metal molds will be high quality products that are free from flaws such as so-called flow marks and cold marks.

Reference numeral 13 denotes a sleeve and reference numeral 14 denotes a heater of the hot nozzle 5.

Figure 5:
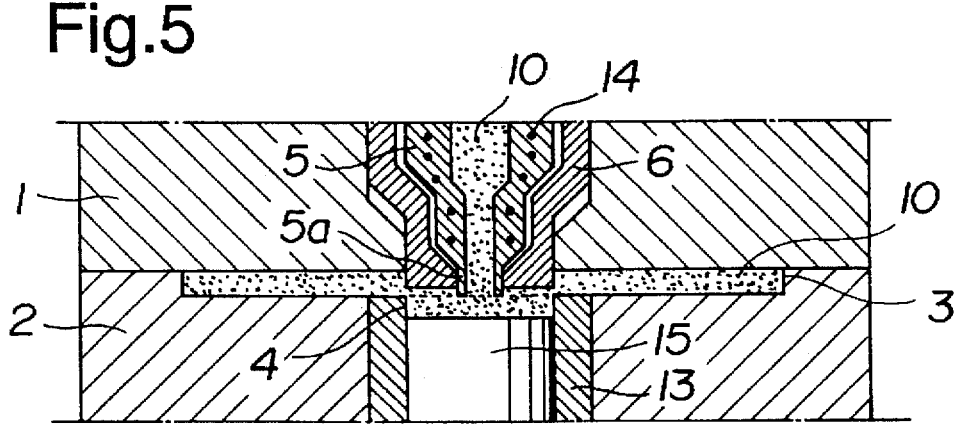
FIG. 5 is a schematic cross sectional view of a principal portion of another embodiment of the metal mold according to the invention, illustrating how molten resin is injected from a temporarily provided runner section into a cavity.
Figure 6:
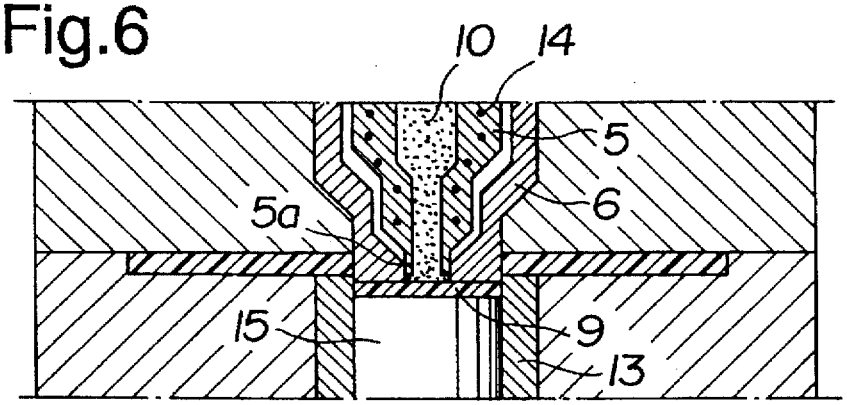
FIG. 6 is a schematic cross sectional view of the embodiment of FIG. 1, illustrating how a resin layer is formed in a recess.
Figure 7:
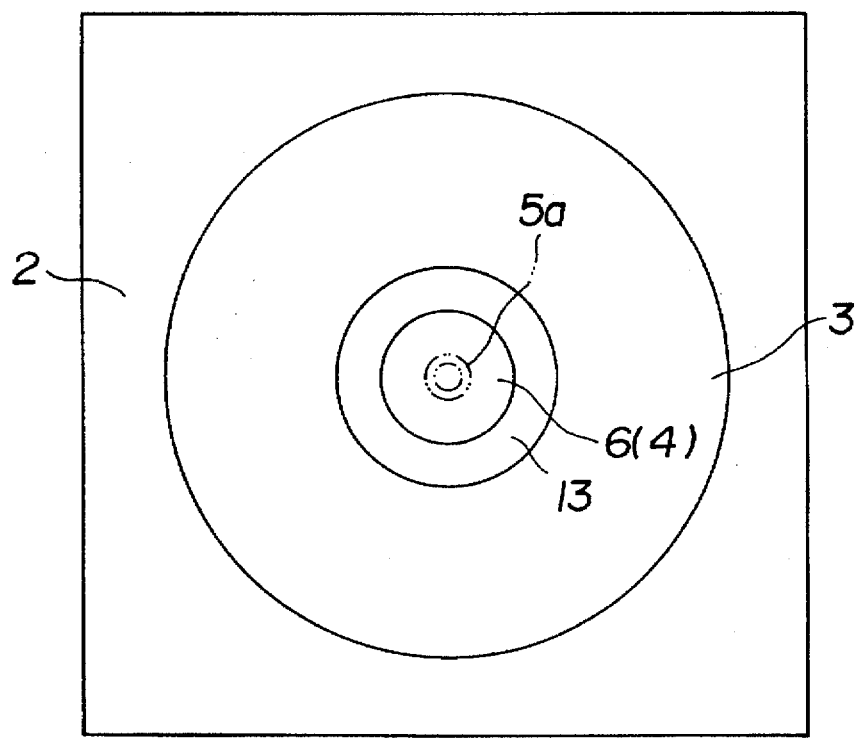
FIG. 7 is a plan view of the movable mold half of the embodiment of FIG. 5.

FIGS. 5 and 6 illustrate an embodiment that a recess 4 is formed on the movable mold half 2 and a compression core 6 having a bore is arranged on the stationary mold half 1. In this embodiment, a hot nozzle 5 is inserted into the bore of the hollow compression core 6 until the nozzle tip 5a is aligned with or slightly projecting from the front end of the compression core 6. The recess 4 is formed as the front end of a core 15 inserted into and secured in the central sleeve 13.

With such an arrangement, the temporary runner section 7 is closed and molten resin 10 is forced into the recess 4 and compressed to produce a resin layer 9 as the molten resin in the recess 4 is cooled and solidified. The resin layer 9 remains in the recess 4 if the compression core 6 is retracted to its normal position so that a normal runner section 11 (not shown) is produced between it and the compression core 6 and operates as an insulation layer as in the case of the first embodiment.

Figure 8:
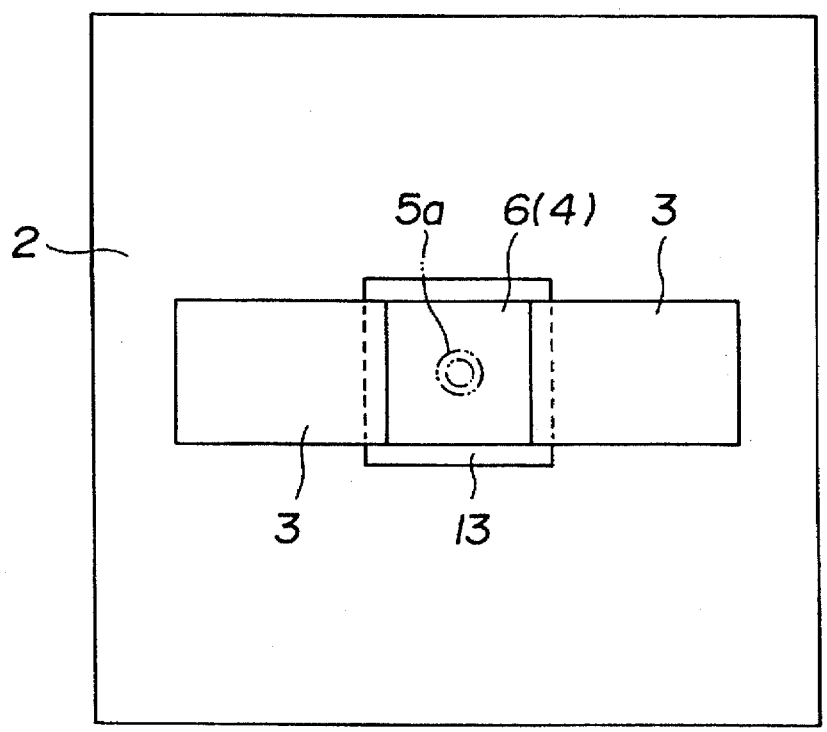
FIG. 8 is a plan view of a still another embodiment of the metal mold according to the invention, comprising a plurality of cavities.

While a single doughnut-like product is produced by either of the above embodiments that are provided with an annular gate defined by the peripheral edge of lateral wall of the recess, the present invention is applicable to a metal mold for manufacturing a plurality of molded products at a time that is provided with a gate arranged at a lateral position. FIG. 8 shows an embodiment comprising an oblong cavity with a recess 4 and a compression core 6 having a square plan view and arranged in vertical juxtaposition at the center thereof to produce a runner section so that the cavity is divided into two cavity sections 3, 3 having respective gates defined by the peripheral edges of the compression core 6.

Note that, if necessary, the width of the runner section may be made smaller than that of the cavity. Then, a recess and a compression core having a rectangular plan view are vertically juxtaposed between a pair of cavities, whose width may also be modified if necessary.

In any of the above embodiments, a recess 4 and a compression core 6 are respectively arranged in the stationary mold half 1 and the movable mold half 2 or vice versa in such a way that the compression core 6 may be retractably received by the recess 4 and the nozzle tip 5a of the hot nozzle 5 may be aligned with or slightly projecting from the front end of the compression core 6. Then, the resin left in the recess in the first molding cycle is compressed and solidified to produce a resin layer 9 so that a proper runner section 11 is formed between the resin layer 9 and the compression core 6 and may become closed and opened by means of the compression core 6. With this arrangement, the molten resin 10 in the runner section 11 is forced into the hot nozzle 5 and the cavity 3 by advancing the compression core 6 so that the runner section 11 is now closed by the front end of the compression core 6 to produce runnerless molded products.

The present invention is particularly advantageous for producing doughnut-like products such as discs because the runner does not have to be removed by punching out a central opening when finished and the products are free from any external force that may be otherwise applied by a cutter or the like.

Additionally, since a proper gate section is formed between the peripheral edges of the recess 4 and the compression core 6, the height of the gate is substantially equal to that of the runner so that molten resin 10 is poured into the cavity 3 through the gate without a narrowed flow path and, therefore, the metal mold is free from the problem of the resistance of the gate. Since the resin layer 9 operates as an insulation layer of the proper runner section 11, the nozzle tip 5a of the runner section 11 is substantially free from the cooling effect of the metal mold so that the nozzle tip 5a does not have to be heated to maintain the resin in the nozzle in a molten state.

Finally, a plurality of runner sections can be formed by arranging a recess and a compression core in juxtaposition for each runner section, a plurality of runnerless products that have a gate at a lateral side and are not necessarily disc-shaped can be produced by simultaneously molding. Thus, the metal mold has a simple configuration and does not require heating means for heating the runner nor cutting means such as a punch and, therefore, it can enjoy a long service life without losing its strength.

What is claimed is:

1. A metal mold for molding a runnerless product, said mold comprising:

a stationary mold half provided at the center thereof with a recess having a port at the center thereof, a movable mold half provided with a compression core to be retractably received by said recess, said stationary and movable mold halves defining a cavity for the runnerless product, a hot nozzle disposed in the port of said recess of the stationary mold half and having a tip projecting therefrom to allow resin to be left around the nozzle, where a temporary runner section and a gate are defined by said recess and the compression core so as that they are closable by the movement of said compression core such that said temporary runner section and said gate are occupied by said compression core when said compression core is retractably received by said recess.

2. A metal mold according to claim 1 wherein said stationary and movable mold halves define a disc-shaped cavity and said recess and compression core are circular in plan View and are juxtaposed at the center thereof so as to form a circular runner section having an annular gate being defined by the peripheral edges of the compression core and the recess.

3. A metal mold according to claim 1, wherein said stationary and movable mold halves define a plurality of oblong cavities.

4. A metal mold for molding a runnerless product, said mold comprising;

a movable mold half provided at the center thereof with a recess, a stationary mold half provided with a compression core to be retractably received by said recess, said compression core having a bore thereinside, said stationary and movable mold halves defining a cavity for the runnerless product, a hot nozzle inserted into the bore of said compression core of the stationary mold half and having a tip projecting therefrom to allow resin to be left around the nozzle, where, a runner section and a gate are defined by said recess, and the compression core so as that they are closable by the movement of said compression core.

5. A metal mold according to claim 4 wherein said stationary and movable mold halves define a disc-shaped cavity and said recess and compression core are circular in plan view and are juxtaposed at the center thereof so as to form a circular runner section having an annular gate being defined by the peripheral edges of the compression core and the recess.

6. A metal mold according to claim 4 wherein said stationary and movable mold halves define a plurality of oblong cavities.

* * * * *

UNITED STATES PATENT AND TRADEMARK OFFICE
CERTIFICATE OF CORRECTION

PATENT NO. : 5,690,974
DATED : November 25, 1997
INVENTOR(S) : Kazuki Miyairi

It is certified that error appears in the above-identified patent and that said Letters Patent is hereby corrected as shown below:

Column 6 (claim 2), line 15, "View" should read --view--.

Column 6 (claim 4), line 36, "where," should read --where--.

Column 6 (claim 4), line 37, "recess," should read --recess--.

Signed and Sealed this

Second Day of March, 1999

Attest:

Q. TODD DICKINSON

Attesting Officer

Acting Commissioner of Patents and Trademarks